United States Patent
Ross Morrey et al.

(10) Patent No.: US 11,034,901 B2
(45) Date of Patent: Jun. 15, 2021

(54) PLANT AND METHOD FOR GENERATING NEGATIVE EMISSIONS OF $CO_2$

(71) Applicant: CO2APPS S.R.L., Galbiate (IT)

(72) Inventors: Dennis Alexander Ross Morrey, Germantown, MD (US); Giovanni Cappello, Galbiate (IT)

(73) Assignee: CO2APPS S.R.L., Galbiate (IT)

( * ) Notice: Subject to any disclaimer, the term of this patent is extended or adjusted under 35 U.S.C. 154(b) by 0 days.

(21) Appl. No.: 16/480,265

(22) PCT Filed: Jan. 19, 2018

(86) PCT No.: PCT/IB2018/050336
§ 371 (c)(1),
(2) Date: Jul. 23, 2019

(87) PCT Pub. No.: WO2018/134775
PCT Pub. Date: Jul. 26, 2018

(65) Prior Publication Data
US 2019/0382671 A1 Dec. 19, 2019

(30) Foreign Application Priority Data
Jan. 23, 2017 (IT) .................. 102017000006623

(51) Int. Cl.
*C10J 3/82* (2006.01)
*C10J 3/02* (2006.01)
*C10J 3/46* (2006.01)
*C04B 2/10* (2006.01)
*C01B 32/50* (2017.01)
(Continued)

(52) U.S. Cl.
CPC ............... *C10J 3/82* (2013.01); *B01D 53/02* (2013.01); *C01B 3/12* (2013.01); *C01B 3/34* (2013.01); *C01B 32/50* (2017.08); *C04B 2/108* (2013.01); *C10K 1/005* (2013.01); *C10K 3/04* (2013.01); *B01D 2257/504* (2013.01); *C01B 2203/0244* (2013.01); *C01B 2203/0283* (2013.01);
(Continued)

(58) Field of Classification Search
None
See application file for complete search history.

(56) References Cited

U.S. PATENT DOCUMENTS

2014/0158939 A1* 6/2014 Ramkumar ............ C01B 3/344
252/373

* cited by examiner

*Primary Examiner* — Daniel Berns
(74) *Attorney, Agent, or Firm* — Brandon V. Zuniga; James R. Gourley; Carstens & Cahoon, LLP

(57) ABSTRACT

The invention relates to a plant for generating negative emissions of $CO_2$. The plant 100 comprises a gasifier 110, a lime kiln 130, a separator 150, and a $CO_2$ permanent storage 170. The gasifier is suitable for receiving as input a fuel 111 and for producing as output a high-temperature syngas flow 114. The lime kiln is suitable for receiving as input carbonate mineral 131 and the high-temperature syngas flow, the lime kiln being further suitable for producing an oxide 134 and for releasing as output a flow of syngas 133 enriched with $CO_2$. The separator is suitable for receiving as input a gas flow containing $CO_2$ and for treating it so as to separately provide at least $CO_2$ 151. The $CO_2$ permanent storage is suitable for enclosing along time the $CO_2$. The invention also relates to a method for generating negative emissions of $CO_2$.

6 Claims, 5 Drawing Sheets

(51) Int. Cl.
    *C01B 3/12*           (2006.01)
    *C01B 3/34*           (2006.01)
    *C01B 3/38*           (2006.01)
    *C01B 3/48*           (2006.01)
    *B01D 53/02*         (2006.01)
    *C10K 1/00*           (2006.01)
    *C10K 3/04*           (2006.01)

(52) U.S. Cl.
    CPC ...... *C01B 2203/06* (2013.01); *C01B 2203/86*
              (2013.01); *C10J 2300/1612* (2013.01)

PLANT AND METHOD FOR GENERATING NEGATIVE EMISSIONS OF $CO_2$

CROSS-REFERENCE TO RELATED APPLICATIONS

This application is a U.S. 371 Application from PCT/IB2018/050336 filed Jan. 19, 2018, which claims priority to Italian Application 102017000006623 filed Jan. 23, 2017, the technical disclosures of which are hereby incorporated herein by reference.

The subject of the present invention is a method and a system for generating negative emissions of $CO_2$ using fuels.

The effects of the so-called "greenhouse gases" on climate and, above all, the correlation between concentration in the atmosphere of $CO_2$ (carbon dioxide or even carbonic anhydride) and global warming have been known for some time.

The efforts of the scientific community and world politics in recent years are concentrated in trying to counteract the increase in greenhouse gas emissions into the atmosphere, to avoid the phenomenon of global warming, i.e. the increase in global average temperature.

In a known way, many initiatives have been promoted at international level aimed at limiting $CO_2$ emissions into the atmosphere: it is worth mentioning, among others, the Kyoto Protocol in 1997 and the Paris Agreement in 2015.

The ways identified by the scientific community to avoid global warming are many and concern substantially the reduction of the use of fossil fuels such as coal, oil and natural gas, favouring the development of renewable energy such as hydraulic, wind, solar and biomass energy.

In addition, many efforts by the international community are focused on improving energy efficiency, such as in the case of lighting with low-energy light bulbs, on transporting with new generation high-efficiency engines and, in the context of electric power generation, on the replacement of old and inefficient coal or fuel oil power plants with new combined-cycle plants with a gas turbine and a steam turbine, with energy efficiency close to 60%.

Despite the technological effort underway in the most advanced nations, the forecasts of well-known international institutions on the need for energy at global level in the coming years indicate a strong increase in the demand for electric power, for thermal energy in the industry and for transport fuels.

Consequently, these forecasts indicate a steady increase in the use of fossil fuels such as oil, coal and natural gas, especially from emerging, newly industrialized and developing countries. This consumption is in fact favoured by the enormous availability of these resources and by the discovery of new fields and techniques for their extraction, factors that, on the whole, make these energy sources economically advantageous.

Using the data provided by these authoritative studies, not only a global decrease in $CO_2$ emissions is not expected to counteract global warming, but instead a substantial increase in emissions over the next 50 years is forecast, mainly due to the increase of the world population and the new industrialization of entire countries.

The catastrophic effects of this situation on climate are easy to understand and difficult to avoid, especially because developing nations believe that the renewable energy option is too sophisticated and expensive and they are more oriented to short-term economic development programs than to containment of $CO_2$ emissions and environmental issues.

Different technologies have been proposed in order to capture and sequester $CO_2$ produced by industrial and power generation plants in which fossil fuels are used. Generally, all these technologies provide for a separation of $CO_2$ from other gases through the use of chemical/physical means.

Most of the proposed capture and storage technologies concern concentrated $CO_2$ emissions like those found in the fumes of power stations or industrial plants.

In many sectors such as aviation, transport, agriculture, industry and livestock, it is not currently possible to apply either direct capture systems for $CO_2$ emissions or to replace the fuels used up to now. For this reason, there is a growing need for systems allowing for the capture and storage of $CO_2$ from the air thus creating the so-called "negative $CO_2$ emissions" which offset at a distance $CO_2$ emissions from the previously mentioned sectors.

In a known way, different technologies have been proposed to capture $CO_2$ directly from the air (Direct Air Capture—DAC) or from $CO_2$ flows from plants operating on biomass as those for the production of ethanol with subsequent definitive sequestration, using technologies for carbon capture and sequestration known as CCS (Carbon Capture and Sequestration).

The main proposed and known CCS technologies are:
$CO_2$ sequestration in deep saline aquifers, a method recognized and promoted by the European Union through a special directive of 2009.
$CO_2$ sequestration directly in the ocean floor, in liquid form.
$CO_2$ sequestration in calcium carbonates or calcium silicates, either direct or with the use of peptoids, known as Mineral Carbonation.
$CO_2$ sequestration in oil wells where it is injected to increase the oil production of the same well with a technology called EOR (Enhanced Oil Recovery).
$CO_2$ sequestration in glass-ceramic capsules in the deep sea with a technology called SCS (Submarine Carbon Storage) proposed by the international patent application WO 2016/088002 A1.

Although there are various available technological alternatives, one of the most important remaining challenges appears to be the prohibitive cost of capture and storage of $CO_2$ directly from the air to generate the so-called negative emissions of $CO_2$ and the ability to implement them on a global scale.

It should be noted here that a natural and very efficient mechanism for capturing $CO_2$ directly from the air is known. The partial pressure of $CO_2$ in the atmosphere must be balanced with that dissolved in the ocean's waters. For this reason, it is estimated that about one third of the anthropogenic $CO_2$ released annually into the atmosphere is absorbed by the oceans. This phenomenon, while removing a huge amount of $CO_2$ from the atmosphere, leads to acidification of the waters of the oceans, generating considerable problems for the balance of marine flora and fauna.

In a known way, the negative emissions needed to reach the objectives of the 2015 Paris agreement should be of several gigatons per year (i.e. in the order of $10^{12}$ kilograms/year) from the years 2020-2030 and should be made in addition to all the techniques of reduction of direct $CO_2$ emissions such as the implementation of renewable energies, energy saving, etc.

As immediately understandable, there is the need to identify a technology that allows to realize negative emissions at an acceptable cost or even with an economic profit to allow their rapid and massive application.

The object of the present invention is to provide a method and a system that can produce negative emissions at low costs compared to known technologies or even generate an economic profit.

This aim and these tasks are achieved by means of a system and a method for the capture of $CO_2$ from the environment and for the storage of $CO_2$ according to claim 1.

To better understand the invention and appreciate its advantages, some of its exemplifying and non-limiting embodiments are described below with reference to the accompanying drawings, wherein.

Figure 1:
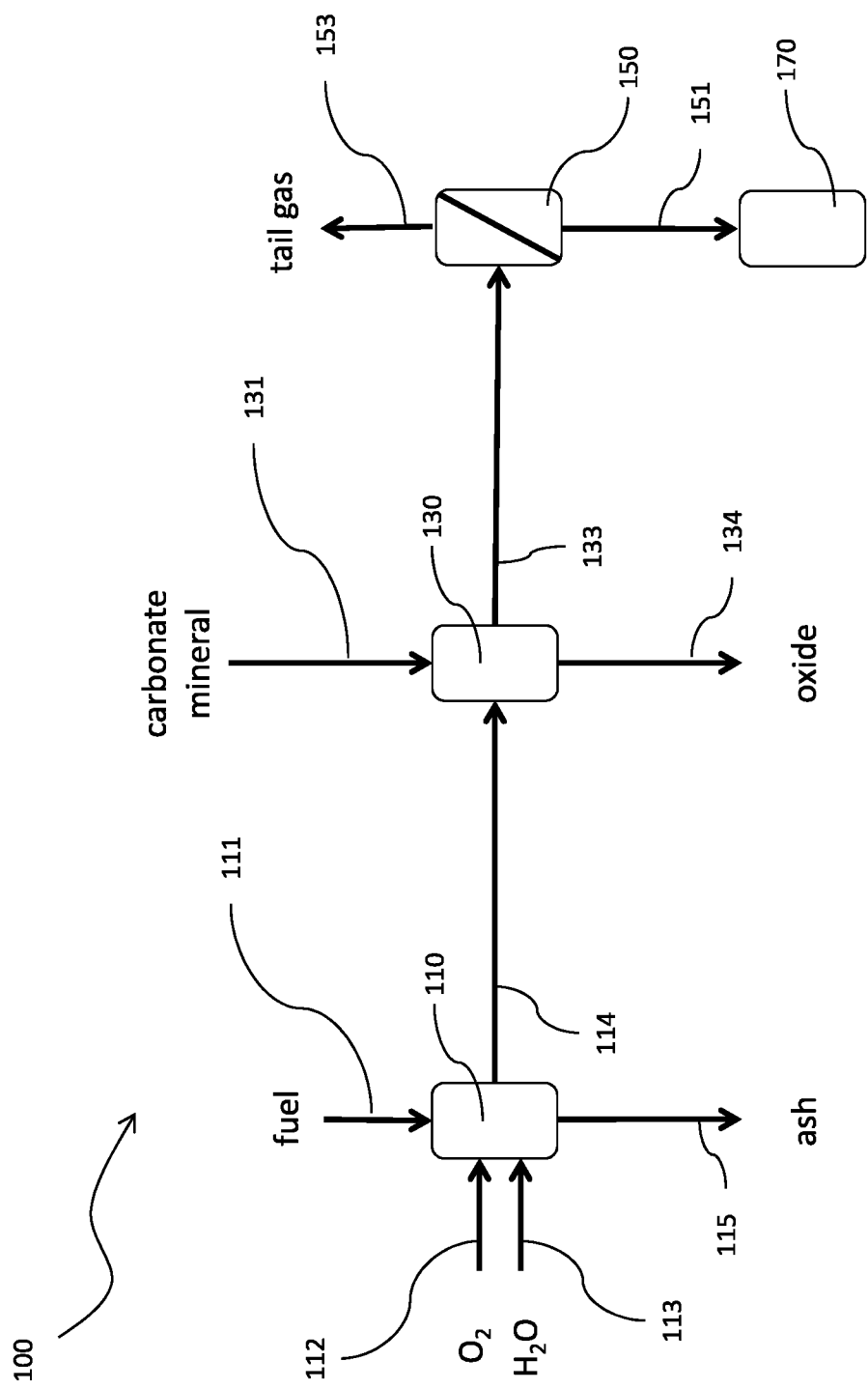
FIG. 1 is a schematic view of a process for the generation of negative $CO_2$ emissions according to the invention.

In the description, reference will be made to $CO_2$, meaning a mixture of gas containing predominantly carbon dioxide, in the solid or liquid or gaseous or supercritical state and other substances such as $N_2$, $O_2$, CO, $H_2S$, $SO_2$, $NO_x$ and $H_2O$.

In the description, reference will also be made to the synthesis gas or syngas, meaning a mixture of gas containing predominantly $CO_2$, CO, $H_2$, $CH_4$ in any proportion at the gaseous state and other substances including $N_2$, $O_2$, HC (hydrocarbons), HCO (oxygenated hydrocarbons), $H_2S$, $SO_2$, $NO_x$ and $H_2O$.

In the description, reference will also be made to $O_2$, meaning a mixture of gas containing mainly oxygen and other substances, including $N_2$ and $H_2O$ in any proportion. Atmospheric air falls within the definition of $O_2$ as a particular case.

In the description, reference will also be made to $H_2O$, meaning water in the liquid or vapour phase with the characteristics of salinity and temperatures necessary for use in the process according to the invention.

The description will also refer to the atmosphere, meaning any place in contact with atmospheric air.

The description will also refer to the ocean, meaning with this not only an actual ocean, but also a sea, a lake, a river or any kind of salty or fresh water body.

In the description, reference will also be made to $H_2$, meaning a mixture of gas containing mainly hydrogen and other substances including CO, $CO_2$, $CH_4$, $N_2$ and $H_2O$ in a proportion preferably less than 20% by volume.

The description will also refer to $CH_4$ meaning by that a gas mixture containing predominantly methane and other substances including CO, $CO_2$, $H_2$, $N_2$ and $H_2O$ in a proportion preferably less than 20% by volume.

The description will also refer to fuel as any liquid, solid or gaseous substance containing carbon such as for example mineral coal, biomass, natural gas, petroleum, plastics.

In the description, reference will also be made to ash meaning the solid residue of the gasification process formed both by inorganic material and by carbonaceous material. The carbonaceous residue in the ash can vary from 0% by weight to 99% by weight in the case of biochar.

In the description, reference will also be made to the gasifier, meaning any system known per se capable of generating a syngas starting from a fuel. For example, the gasifiers can be of the following types: updraft, downdraft, crossdraft, fluidized bed, entrained, slagging, pyrolizers, Methane Reformers or gasifiers that exploit solar energy.

The description will also refer to carbonate mineral meaning any calcareous or dolomitic sedimentary rock such as calcite, aragonite, dolomite, siderite, magnesite, marble, but also any other carbonate material such as shells or corals.

In the description, reference will also be made to the lime kiln (or furnace) meaning any system, known per se, capable of calcinating the carbonate mineral. The calcination process, known per se, takes place at temperatures preferably between 500° C. and 1200° C.

In the description, reference will also be made to the oxide, meaning the product of calcination formed predominantly by calcium oxide CaO or magnesium oxide MgO and to a lesser extent by other materials present in the carbonate mineral with which the lime kiln is fed.

In the description, reference will also be made to the hydroxide, meaning the product of the hydration of calcium oxide $Ca(OH)_2$ or of the magnesium oxide $Mg(OH)_2$ with the following chemical reactions:

$$CaO + H_2O \rightarrow Ca(OH)_2$$

$$MgO + H_2O \rightarrow Mg(OH)_2$$

In the description reference will also be made to the separator meaning any system, known per se, capable of separating the various gases present in a gaseous flow, in particular separating from the gaseous flow $H_2$, $CH_4$ and $CO_2$. The operation of the separator can be based on any physical and/or chemical principle useful for the purpose of separating the different gases. For example, it can consist of membranes, absorption systems (pressure/temperature swing adsorption—PSA/TSA), systems for the chemical removal of acid gases that use methanol, amines, etc.

In the description, reference will also be made to useful chemicals meaning one or more raw materials which may be used in industry, for example methanol, ethanol, ammonia ($NH_3$) and synthetic fuels, or synfuels, produced by Fischer-Tropsch conversion.

In the description reference will also be made to the exploiting device meaning any system, known per se, capable of exploiting the syngas, for example for the production of electric power, and/or of heat and/or of useful chemicals. As examples of exploiting devices the following can be listed: engines, gas turbines, fuel cells, boilers, Fischer-Tropsch reactors and reactors for the synthesis of methanol and ammonia.

In the description, reference will also be made to the off-gas meaning the gaseous residue of the oxidation process of the syngas which typically occurs in the exploiting device. The off-gas is mainly composed of $CO_2$, $H_2O$, $N_2$ in any proportion.

In the description, reference will also be made to the gaseous residue, commonly called tail gas, meaning a mixture of gas containing mainly CO, $H_2$, $H_2O$, $N_2$, $CH_4$ in any proportion and $CO_2$ residues, leaving the separator downstream of the $CO_2$ separation. The tail gas, which may be at least partially combustible, may be used in processes external to the process according to the invention or be suitably reused in the processes of the system according to the invention.

The description will also refer to the reformer meaning any system, known per se, capable of catalytically or thermally reforming the hydrocarbons, including $CH_4$. For example, the reformer can be either of the type steam methane reformer—SMR or of the type autothermal reformer—ATR.

In the description, reference will also be made to a WGS reactor meaning any system, known per se, capable of promoting the reaction known as Water Gas Shift:

$$CO + H_2O \rightarrow CO_2 + H_2$$

The description will also refer to a permanent storage, meaning any system, known per se, capable of confining $CO_2$ over time, such as the EOR (Enhanced Oil Recovery), the geological CCS (Carbon Capture and Storage) or the SCS (Submarine Carbon Storage). As the skilled person can understand, mentioned storage systems ensure that a high percentage of stored $CO_2$ can be confined for hundreds or thousands of years. Other known systems can of course be used as long as they meet this condition. On the other hand, a system that keeps $CO_2$ confined only temporarily and then uses it in industrial processes, as a result of which it returns freely to the environment, is not considered a permanent storage system.

In the description, reference will also be made to high temperature, meaning a temperature of more than 500° C.

In the attached figures, reference number 100 indicates the process according to the invention as a whole.

A first aspect of the invention relates to a system 100 for the generation of negative emissions of $CO_2$. The system 100 includes a gasifier 110, a lime kiln 130 placed downstream of the gasifier 110, a separator 150 placed downstream of the lime kiln 130, and a permanent storage 170 of the $CO_2$ placed downstream of the separator 150.

The gasifier 110 is suitable for receiving a fuel 111 at its inlet and for producing a high-temperature syngas flow 114 at the outlet.

The lime kiln 130 is suitable for receiving as input carbonate mineral 131 and the high-temperature syngas flow 114 produced by the gasifier 110, the lime kiln being further suitable for producing an oxide 134 and for releasing as output a flow of syngas 133 enriched with $CO_2$.

The separator 150 is suitable for receiving as input a gas flow containing $CO_2$ and for treating it so as to separately provide at least $CO_2$ 151.

The $CO_2$ permanent storage 170 is suitable for enclosing along time the $CO_2$ 151 provided by the separator 150.

It should be noted here that the gas supplied to the separator 150 may be the syngas (indicated with 133) enriched with $CO_2$ by the lime kiln 130 or, as will be better described below, it may be the syngas (indicated with 143) enriched with $CO_2$ and $H_2$ in a WGS reactor 140 or it may be the off-gas (indicated with 147) which represents the residual of the use of the syngas in an exploiting device 145.

According to an embodiment of the plant 100, a reformer 120 is included between the gasifier 110 and the lime kiln 130. The reformer 120 is suitable for receiving as input the high-temperature syngas flow 114 produced by the gasifier 110, is suitable for reforming, either catalytically or thermally, the hydrocarbons present in the syngas, and is suitable for releasing as output a high-temperature syngas flow enriched with $H_2$.

According to an embodiment of the plant 100, a WGS reactor 140 is included between the lime kiln 130 and the separator 150. The WGS reactor is suitable for receiving the syngas flow 133 enriched with $CO_2$ coming out of the lime kiln 130. This gas also contains CO and $H_2O$. The WGS reactor 140 is suitable for promoting the Water Gas Shift reaction, and is suitable for releasing a syngas flow 143 enriched with $CO_2$ and $H_2$.

According to an embodiment of the plant 100, between the lime kiln 130 and the separator 150, an exploiting device 145 is included, suitable for receiving at the input the syngas flow 133 enriched with $CO_2$. The exploiting device 145 is also suitable for exploiting the syngas for producing electric power, and/or heat and/or useful chemicals. The exploiting device 145 releases an off-gas flow 147 at the outlet.

According to an embodiment of the plant 100, the separator 150 is suitable for receiving a gas stream containing $H_2$ at its inlet and to treat it so as to make separately available at least the $H_2$ 152 in addition to the $CO_2$ 151.

It should be noted here that the gas supplied to the separator 150 may be the syngas (indicated with 133) coming out of the lime kiln 130 or, as described earlier, it may be the syngas (indicated with 143) enriched with $CO_2$ and $H_2$ in the WGS reactor 140 or it may be even the residual off-gas (indicated with 147) from the use of the syngas in the exploiting device 145. In different cases, the flow of gas entering the separator 150 may have different temperatures.

According to an embodiment, the plant 100 further comprises an apparatus (not shown) for mixing the oxide 134 produced by the lime kiln 130 with ocean water and/or atmospheric air.

The mixing apparatus must guarantee a certain degree of fragmentation of the mass of oxide 134, so as to expose an adequate surface to the contact with the ocean water or with the atmosphere.

In case it is decided to mix the oxide 134 with ocean water, the function of the mixing apparatus is less critical because the reaction between the oxide (typically CaO) and the water is very violent and tends to break up the large masses of oxide.

On the contrary, if it is decided to mix the oxide 134 with the atmospheric air, the mixing apparatus must fragment the mass of oxide 134 so as to considerably increase the ratio between the surface and the volume of the individual oxide masses. In this way, an effective and rapid absorption of $CO_2$ is possible.

Alternatively or additionally, the system 100 may comprise an apparatus (not shown) for mixing the hydroxide, obtained by hydrating (or slaking) the oxide 134, with ocean water and/or with atmospheric air.

A second aspect of the invention relates to a method for the generation of negative emissions of $CO_2$. The method according to the invention comprises the following steps:
    providing a gasifier 110;
    feeding a fuel 111 to the gasifier 110 so as to obtain a high-temperature syngas flow 114;
    conveying the high-temperature syngas flow 114;
    providing a lime kiln 130;
    feeding carbonate mineral 131 to the lime kiln 130;
    feeding the high-temperature syngas flow 114 to the lime kiln 130 so as to obtain an oxide 134 and a gas flow 133 enriched with $CO_2$;
    retrieving oxide 134 from the lime kiln 130;
    conveying the gas flow 133 enriched with $CO_2$;
    providing a separator 150;
    feeding the gas flow 133 enriched with $CO_2$ to the separator 150;
    separately providing at least $CO_2$ 151;
    providing a permanent storage 170 for $CO_2$ 151; and
    conveying the $CO_2$ 151 provided by the separator 150 to the permanent storage 170 so as to enclose it along time.

According to an embodiment, the method further comprises the following steps:
    providing a reformer 120 between the gasifier 110 and the lime kiln 130;
    feeding to the reformer 120 the high-temperature syngas flow 114 produced by the gasifier 110;

reforming, either catalytically or thermally, the hydrocarbons present in the syngas 114; and releasing as output from the reformer 120 a high-temperature syngas flow enriched with $H_2$.

According to an embodiment, the method further comprises the following steps:

providing a WGS reactor 140 between the lime kiln 130 and the separator 150;

feeding to the WGS reactor 140 the syngas flow 133 enriched with $CO_2$ and containing CO and $H_2O$ produced by the lime kiln 130;

promoting the Water Gas Shift reaction; and releasing as output from the WGS reactor 140 a syngas flow 143 enriched with $CO_2$ and $H_2$.

According to an embodiment, the method further comprises the following steps:

providing, between the lime kiln 130 and the separator 150, an exploiting device 145;

feeding to the exploiting device 145 the syngas flow 133 enriched with $CO_2$;

exploiting the syngas 133 for producing electric power, and/or heat and/or useful chemicals;

releasing as output from the exploiting device 145 an off-gas flow 147.

According to an embodiment, the method further comprises the following steps:

feeding to the separator 150 a gas flow containing $H_2$; and separately providing at least $H_2$ 152.

As already highlighted earlier, the gas fed to the separator 150 may be the syngas (indicated with 133) coming out of the lime kiln 130, or it may be the syngas (indicated with 143) coming out of the WGS reactor 140, or it may be even the residual off-gas (indicated with 147) coming out of the syngas in the exploiting device 145.

According to an embodiment, the method further comprises the step of mixing the oxide 134 produced by the lime kiln 130, or the relative hydroxide, with the ocean water and/or with atmospheric air.

Referring to FIG. 1, it can be seen that the gasifier 110 is supplied with fuel 111 together with the necessary quantities of $O_2$ 112 and $H_2O$ 113 for the production, in a per se known manner, of syngas 114. The syngas 114 at the outlet of the gasifier 110 can reach a temperature preferably between 600° C. and 1300° C., depending on the temperature required by the lime kiln 130. The ash 115 is also evacuated from the gasifier 110.

The syngas 114 has sufficient temperature and mass flow to allow complete calcination of carbonate mineral 131 with which the lime kiln 130 is fed.

Once the calcination temperature is reached, the carbonate mineral 131 releases $CO_2$ which is mixed with the syngas flow. If the carbonate mineral is calcium carbonate $CaCO_3$, the chemical reaction would be:

$$CaCO_3 \rightarrow CaO + CO_2$$

In a per se known manner, the calcination temperature is a function of the partial pressure of $CO_2$ inside the lime kiln 130.

The product of calcination of carbonate mineral is the oxide 134. The oxide 134 can be slaked before use by adding water, so as to produce hydroxide.

In a per se known form, slaking the oxide 134 with water for the formation of the hydroxide takes place through a strongly exothermic reaction. The heat generated by said reaction can be conveniently used, for example, for the generation of steam and possibly electrical power.

The oxide or hydroxide can be used for their classical uses, such as in building and/or civil works or in agriculture.

In a manner known per se, the oxide, once placed into the atmosphere, naturally turns into hydroxide, absorbing atmospheric humidity. The hydroxide reabsorbs $CO_2$ to form carbonates again. If the hydroxide were calcium hydroxide, the following chemical reaction would occur, called carbonatation:

$$Ca(OH)_2 + CO_2 \rightarrow CaCO_3 + H_2O$$

where one mole of $CO_2$ is absorbed from the atmosphere for each mole of CaO.

In a manner known per se, if the oxide or hydroxide are suitably mixed with ocean water, preferably at a depth between 0 and 5000 m, they create an alkalizing effect.

As already highlighted above, the $CO_2$ dissolved in the ocean water tends to be in balance with the $CO_2$ present in the atmosphere. It is estimated that one third of the anthropogenic $CO_2$ produced annually is absorbed by the oceans, creating problems of acidification of the same. The addition of oxide or hydroxide to the ocean water allows to neutralise the effects of acidification. In case the oxide was calcium oxide, the ideal equation would be:

$$CaO + H_2O + 2CO_2 \rightarrow Ca(HCO_3)_2$$

In fact, due to the complex and known chemistry of ocean water, the number of moles of $CO_2$ neutralized with a mole of oxide is less than 2, typically between 1.4 and 1.8 as a function of temperature and of the PH of the ocean water.

In a per se known form, the overall effect of ocean alkalization is an increase in the PH of ocean water which causes an increase in the ocean's capacity to absorb $CO_2$ from the atmosphere. So the alkalization of the ocean with oxide or hydroxide has the same effect of capturing $CO_2$ directly from the air using the ocean water as a sorbent. The advantages deriving from the exploitation of this natural phenomenon are evident to the skilled person. The enormous exchange surface between the atmosphere and the ocean and the high efficiency of the exchange itself mean that the $CO_2$ sequestered and stored in this way widely exceeds that which can be sequestered and stored with any other type of known DAC system.

Incidentally, it is worth noting here that the addition of calcium oxide to sea water, in addition to the positive effects related to the capture of atmospheric $CO_2$, also has the effect of making available a large amount of calcium ions that are essential for many forms of oceanic life such as corals. As is known, on the contrary, the increasing acidification of the waters that is occurring in recent years has decreased the availability of calcium ions, with serious damage to coral reefs.

As a skilled person can well understand, mixing the oxide or hydroxide with ocean water allows to capture more $CO_2$ than the carbonatation reactions of the oxide and hydroxide directly into the atmosphere.

The syngas 133 exiting the lime kiln 130 is enriched with the $CO_2$ coming from the calcination process of the carbonate mineral. Moreover, any acid gases present in the syngas, such as $H_2S$, HCl and $SO_4$ are neutralized in the lime kiln 130 due to the strong basicity of the oxide 134.

The syngas 133 suitably cooled and possibly dedusted can be sent to the separator 150 in order to separate the $CO_2$ 151.

From the separator 150 a syngas residue called tail gas 153 may come out, which will be used in the most convenient form outside the system or recirculated in the process according to the invention as a function of its chemical composition.

The $CO_2$ 151 is sent to a permanent storage 170 of known type, which can be represented by a geological storage in saline aquifer or in glass ceramic caps laid on the ocean floor as provided by the SCS technology, or still used in the EOR.

Figure 2:
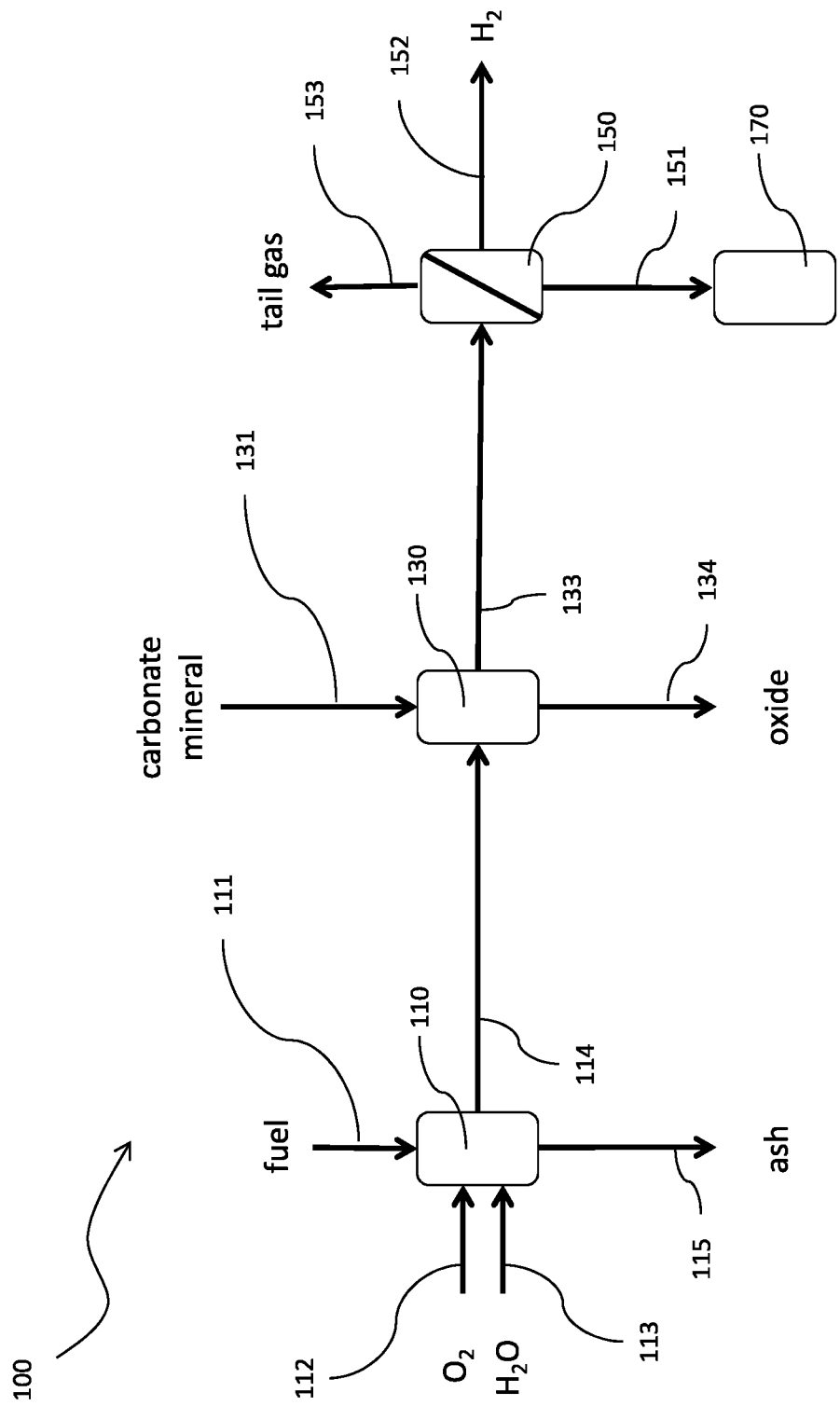
FIG. 2 is a schematic view of a possible embodiment of the process according to the invention.

With reference to the embodiment of FIG. 2, the system 100 according to the invention can comprise a separator 150 in order to separate the $CO_2$ 151 and the $H_2$ 152 from the syngas 133.

Figure 3:
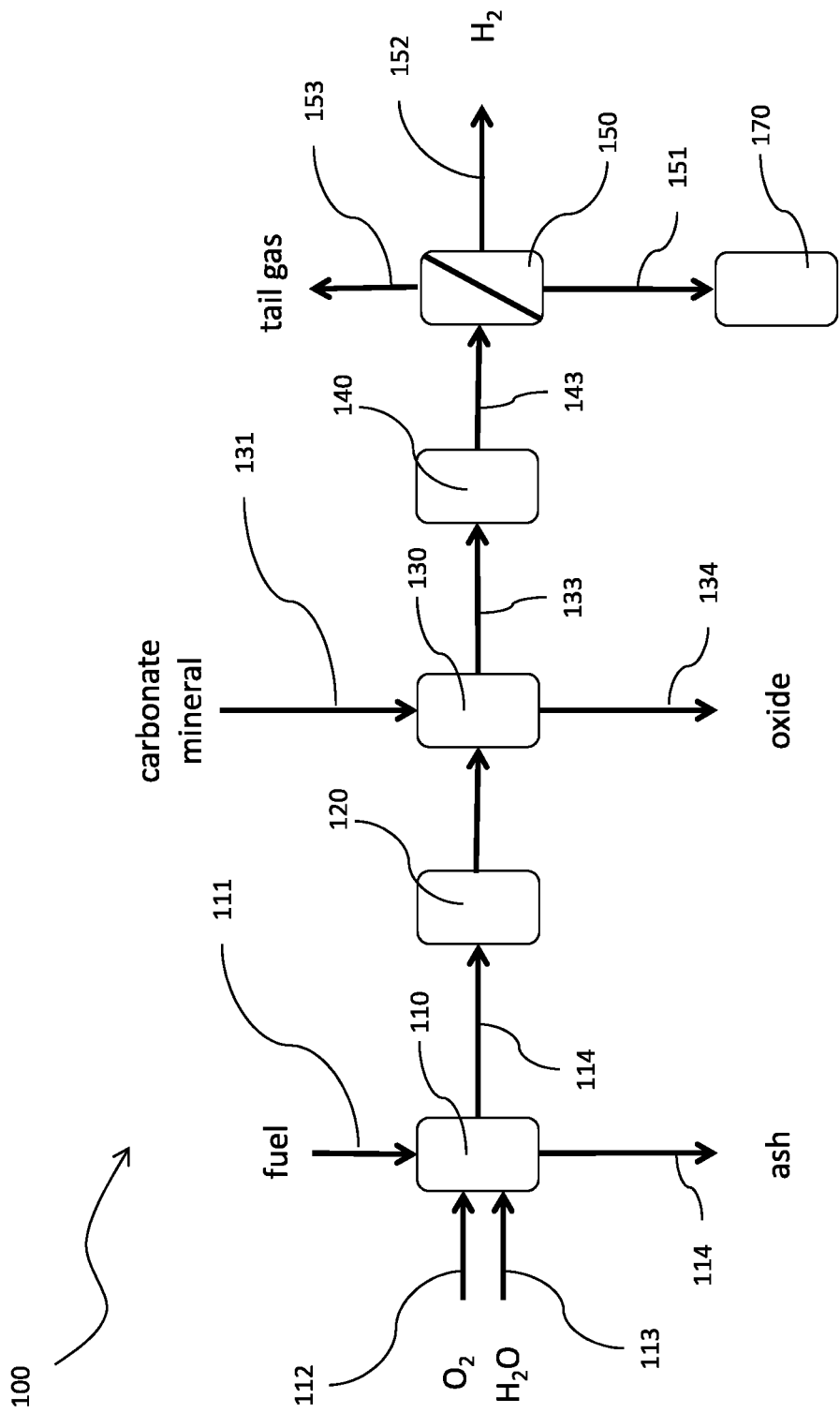
FIG. 3 is a schematic view of a possible embodiment of the process according to the invention.

With reference to the embodiment of FIG. 3, the system 100 according to the invention can comprise a reformer 120 and a WGS reactor 140 for the optimization of the content of $H_2$ in the syngas 143. These components, described here together, do not necessarily have to be provided together but can also be provided separately, in order to meet specific needs.

The $H_2$ produced with the process according to the invention is made available for various civil and industrial uses. Once placed on the market, it can replace fossil fuels such as natural gas, for example in the generation of electric power, or it can be used in place of the $H_2$ produced using natural gas for example with Steam Methane Reformer—SMR for industrial processes such as the production of $NH_3$ or the refining of hydrocarbons.

As the skilled person can well understand, $H_2$ can be easily sold in the market both as hydrogen for chemical processes and, in the most conservative case, as an energy carrier with the same value as traditional energy carriers such as natural gas.

As the skilled person can well understand, the invention makes it possible to produce $H_2$ by capturing and permanently storing all $CO_2$ emissions of the process. The result is to place on the market zero-emission $H_2$ and generate negative emissions with the oxide or hydroxide released into the atmosphere or, in order to obtain a better capture efficiency of the $CO_2$, in the ocean.

As the skilled person can well understand, the revenues of the sale of the $H_2$ allow, in the worst-case scenario, to compensate in full or in part the costs incurred to generate the negative emissions. In the best and most probable hypothesis, the sale of the $H_2$ allows instead to generate an economic profit.

Figure 4:
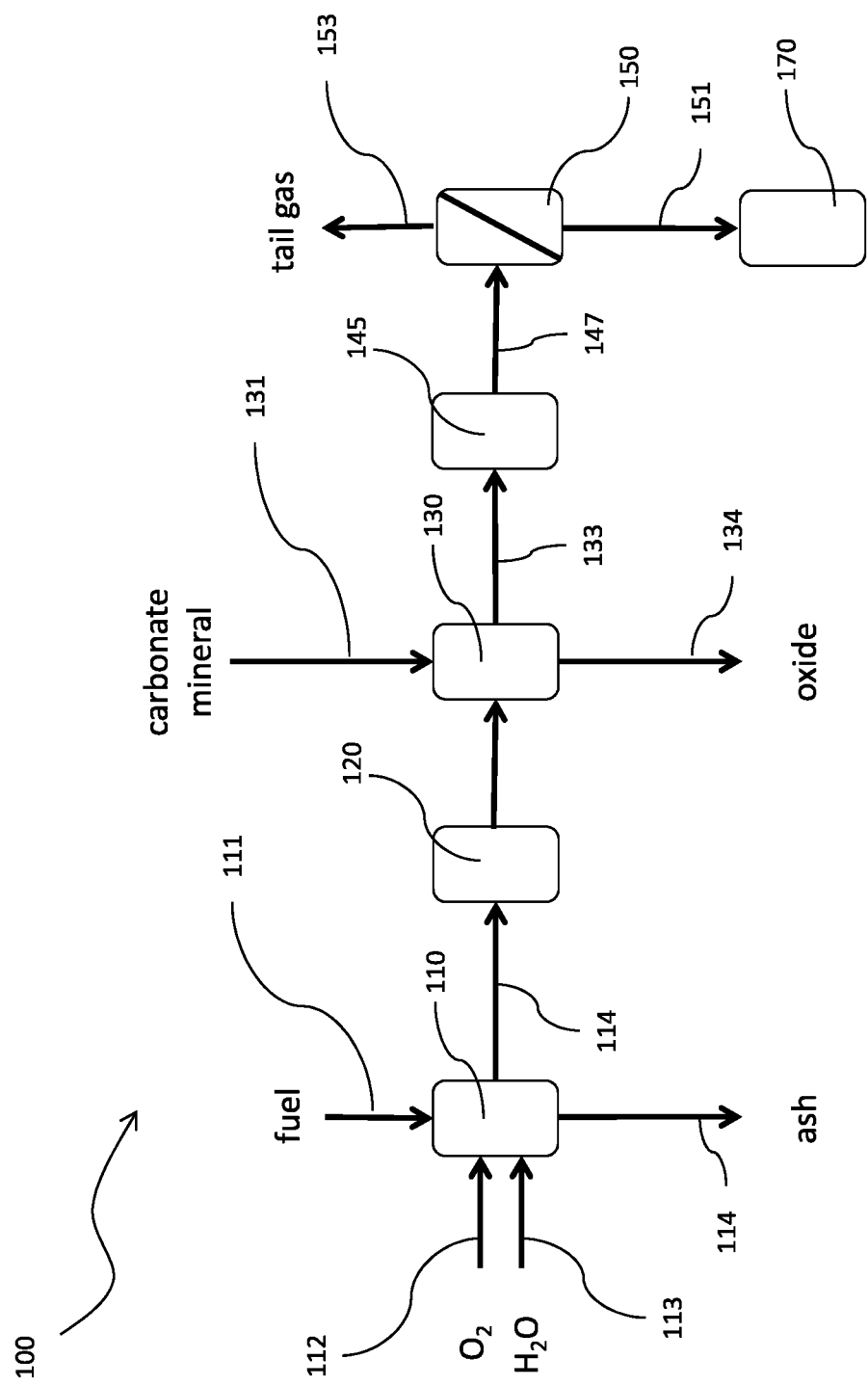
FIG. 4 is a schematic view of a possible embodiment of the process according to the invention.

With reference to the embodiment of FIG. 4, the system 100 according to the invention can comprise a user device 145 for direct use of the syngas 133, aimed at producing electric power and/or heat and/or useful chemicals. The off-gas 147 released by the exploiting device 145 can still contain $CO_2$ and/or $H_2$ and is therefore conveyed to the separator 150 for capture of $CO_2$ and/or $H_2$.

The electric power, heat and/or useful chemicals produced by the process according to the invention are made available for various civil and industrial uses.

As the skilled person can well understand, electric power, heat and/or useful chemicals can easily be sold in the market.

As the skilled person can well understand, the invention allows to produce electric power, heat and/or useful chemicals by capturing and permanently storing the $CO_2$ emissions of the process. The result is to place on the market products at low or zero emissions and generate negative emissions with the oxide or hydroxide released into the atmosphere, or in the ocean to get a better capture efficiency of $CO_2$.

As the skilled person can well understand, the revenues of the sale of the above-mentioned products allow, in the worst-case scenario, to compensate in full or in part the costs incurred to generate the negative emissions. In the best and most probable hypothesis, the sale of such products allows instead to generate an economic profit.

In case $CO_2$ was stored using EOR, an additional oil production would be obtained, generally estimated in 3 barrels of oil for each ton of $CO_2$ injected into the well. The extraction of this amount of oil therefore generates a very significant economic profit.

In a known form, the combustion of one barrel of oil generates emissions equal to about 400 kg of $CO_2$.

As a skilled person can well understand, in the case of EOR a quantity of oil will be put on the market which will generate further $CO_2$ emissions. However, the invention allows to compensate in advance, in whole or in part, the emissions due to the combustion of the oil barrels extracted thanks to the EOR. It is indeed possible to increase the production of oxide in the lime kiln, oxidizing an additional amount of syngas 114 and sacrificing the production of $H_2$ or of the products of the exploiting device. The greater production of oxide allows a greater sequestration of $CO_2$, suitable to compensate in advance, in whole or in part, the emissions deriving from the oil barrels. From an economic point of view, the decrease in the production of $H_2$ and/or of the products of the exploiting device is more than offset by the sale of the extracted oil barrels.

As the skilled person can well understand, the invention therefore allows, in the case of EOR, to extract and sell on the market oil which, having already fully or partially offset the emissions it generates, can be sold at differentiated prices compared to those of a normal oil.

Figure 5:
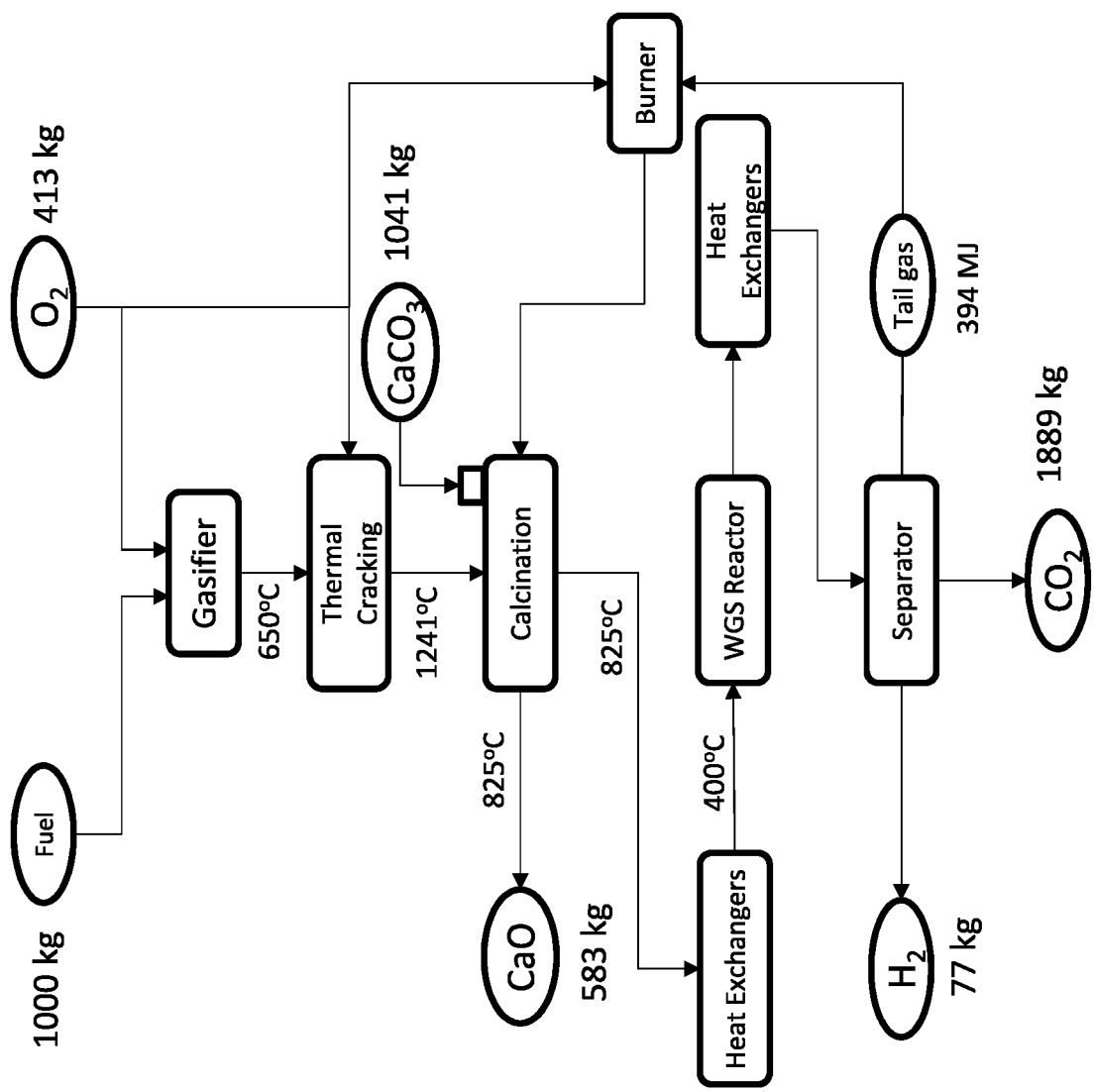
FIG. 5 is a schematic view of a possible mass and energy balance for a process according to the invention.

Referring to FIG. 5, the result of one of the possible embodiments of the invention is described below in order to better understand its advantages. In this specific case, the following are used: lignite as fuel, a non-catalytic high-temperature reformer (thermal cracking), calcareous carbonate mineral ($CaCO_3$), a WGS reactor and a membrane separator (separator).

Consider a lignite with the following characteristics:

|  | Dry base | Wet base |
|---|---|---|
| Elemental analysis | | |
| C | 43.72% | 41.11% |
| H | 2.94% | 2.76% |
| O | 10.52% | 9.89% |
| N | 1.30% | 1.22% |
| S | 0.44% | 0.41% |
| Water | 0% | 5.98% |
| Ash | 41.09% | 38.63% |
| Immediate analysis | | |
| Fixed carbon | 36.90% | 34.69% |
| Volatiles | 22.02% | 20.70% |
| Ash | 41.09% | 38.63% |
| Calorific power MJ/kg | 18.84 | 17.71 |

Always referring to FIG. 5, the skilled person can easily calculate that with a ton of lignite it is possible to produce 77 kg of $H_2$ and as many as 583 kg of CaO while it is necessary to store permanently 1889 kg of $CO_2$ through EOR, geological CCS or SCS.

The 583 kg of CaO allow, once exposed to the atmosphere, to capture 458 kg of $CO_2$ or, once mixed with the ocean water, to neutralize 823 kg of $CO_2$ thus generating respectively 458 kg and 823 kg of negative emissions.

Below are some examples of the economic sustainability of the solution according to the invention. These calculations, performed conventionally in US dollars (USD), are updated to the last months of 2016. In an easily calculable and verifiable manner in the literature, the cost of permanent storage of $CO_2$ with SCS glass ceramic capsules or with geological CCS is between 10 and 20 USD/ton$_{CO2}$ (dollars per ton of $CO_2$) while the costs calculated for the production, including capital expenditure and operating expenditure (commonly called CAPEX and OPEX), of 77 kg of $H_2$ and 583 kg of CaO with the process according to the invention, are approximately 50 USD. The total cost of producing 77 kg of $H_2$ is therefore 86 USD.

A skilled person will be able to agree that, using a typical energy value in 2016 for natural gas of 10 USD/GJ (dollars per GigaJoule), it would be possible to sell the $H_2$ at 1.2 USD/kg and then 77 kg of $H_2$ could generate revenues for 92 USD.

As the skilled person can well conclude, the 583 kg of CaO would cause, in case the oxide was mixed with the ocean water, the generation of negative emissions of about 823 kg of $CO_2$ and, in case of exposure of the oxide to the atmosphere, of 458 kg. This would generate a profit of 6 USD from the sale of the $H_2$ without considering any revenues due to the valorization of the $CO_2$ captured and sequestered from the air.

As the expert can well conclude, the method and the plant according to the invention allow to generate negative emissions not only at low costs, but also with a possible economic profit. It is thus possible to overcome one of the most important obstacles to the diffusion of plants for the generation of negative emissions.

It is clear that the specific features are described in relation to various embodiments of the plant and method, with exemplifying and non-limiting intent. Obviously, in order to satisfy specific and contingent needs, a person skilled in the art may apply further changes and variants to the plant and method according to the present invention, all without departing from the scope of protection of the invention as defined by the following claims.

The invention claimed is:

1. Method for generating negative emissions of $CO_2$, comprising the following steps:
providing a gasifier;
feeding a fuel to the gasifier so as to obtain a high-temperature syngas flow having a temperature between 600° C. and 1300° C.;
conveying the high-temperature syngas flow;
providing a lime kiln;
feeding carbonate mineral to the lime kiln;
feeding (i) the high-temperature syngas flow or (ii) reformed high-temperature syngas flow to the lime kiln, the reformed high-temperature syngas flow being formed by catalytically or thermally reforming hydrocarbons present in the syngas to provide a high-temperature syngas flow enriched with $H_2$;
completely calcinating the carbonate mineral in the lime kiln using (i) the high-temperature syngas flow or (ii) the reformed high-temperature syngas flow, so as to obtain an oxide and a syngas flow enriched with $CO_2$;
retrieving oxide from the lime kiln;
conveying the syngas flow enriched with $CO_2$;
providing a separator;
feeding (i) the syngas flow enriched with $CO_2$ or (ii) syngas flow enriched with $CO_2$ and $H_2$ to the separator, the syngas flow enriched with $CO_2$ and $H_2$ being formed by performing the Water Gas Shift reaction on the syngas flow enriched with $CO_2$;
separately providing at least $CO_2$ from the separator;
providing a permanent storage for $CO_2$;
conveying the $CO_2$ provided by the separator to the permanent storage so as to enclose the $CO_2$ provided by the separator over time; and
mixing the oxide produced by the lime kiln or a related hydroxide with ocean water and/or with atmospheric air, wherein the related hydroxide is the product of the hydration of calcium oxide or magnesium oxide according to the following chemical reactions:

$CaO+H_2O \rightarrow Ca(OH)_2$ and $MgO+H_2O \rightarrow Mg(OH)_2$.

2. Method according to claim 1, the method comprising:
providing a reformer between the gasifier and the lime kiln;
feeding to the reformer the high-temperature syngas flow produced by the gasifier;
reforming in the reformer, either catalytically or thermally, hydrocarbons present in the high-temperature syngas; and
releasing as output from the reformer the reformed high-temperature syngas flow, the reformed high temperature syngas flow being the high-temperature syngas flow enriched with $H_2$.

3. Method according to claim 1, the method comprising:
providing a WGS reactor between the lime kiln and the separator;
feeding to the WGS reactor the syngas flow enriched with $CO_2$ produced by the lime kiln;
performing the Water Gas Shift reaction on the syngas flow enriched with $CO_2$; and
releasing as output from the WGS reactor the syngas flow enriched with $CO_2$ and $H_2$.

4. Method according to claim 1, the method comprising:
feeding to the separator the syngas flow enriched with $CO_2$ and $H_2$; and
separately providing at least $H_2$ from the separator.

5. Method for generating negative emissions of $CO_2$, comprising the following steps:
providing a gasifier;
feeding a fuel to the gasifier so as to obtain a high-temperature syngas flow having a temperature between 600° C. and 1300° C.;
conveying the high-temperature syngas flow;
providing a lime kiln;
feeding carbonate mineral to the lime kiln;
feeding (i) the high-temperature syngas flow or (ii) reformed high-temperature syngas flow to the lime kiln, the reformed high-temperature syngas flow being formed by catalytically or thermally reforming hydrocarbons present in the syngas to provide a high-temperature syngas flow enriched with $H_2$;
completely calcinating the carbonate mineral in the lime kiln using (i) the high-temperature syngas flow or (ii) the reformed high-temperature syngas flow, so as to obtain an oxide and a syngas flow enriched with $CO_2$;
retrieving oxide from the lime kiln;
conveying the syngas flow enriched with $CO_2$;
providing an exploiting device;
feeding to the exploiting device (i) the syngas flow enriched with $CO_2$ or (ii) syngas flow enriched with $CO_2$ and $H_2$, the syngas flow enriched with $CO_2$ and $H_2$ being formed by performing the Water Gas Shift reaction on the syngas flow enriched with $CO_2$;
exploiting the syngas flow enriched with $CO_2$ for producing electric power, and/or heat and/or useful chemicals;

releasing as output from the exploiting device an off-gas flow;
providing a separator;
feeding the off-gas flow to the separator;
separately providing at least $CO_2$ from the separator;
providing a permanent storage for $CO_2$;
conveying the $CO_2$ provided by the separator to the permanent storage so as to enclose the $CO_2$ provided by the separator over time; and
mixing the oxide produced by the lime kiln or a related hydroxide with ocean water and/or with atmospheric air, wherein the related hydroxide is the product of the hydration of calcium oxide or magnesium oxide according to the following chemical reactions:

$$CaO+H_2O \rightarrow Ca(OH)_2 \text{ and}$$

$$MgO+H_2O \rightarrow Mg(OH)_2.$$

6. Method according to claim 5, the method comprising:
feeding to the separator the syngas flow enriched with $CO_2$ and $H_2$; and
separately providing at least $H_2$ from the separator.

* * * * *